(12) United States Patent
Rosell et al.

(10) Patent No.: US 12,679,204 B2
(45) Date of Patent: Jul. 14, 2026

(54) GAUGE CLUSTER ARC LIGHTING

(71) Applicant: GM GLOBAL TECHNOLOGY OPERATIONS LLC, Detroit, MI (US)

(72) Inventors: Dakota Rosell, Wolverine Lake, MI (US); Joseph Mitchell, Troy, MI (US); Joel B. Thompson, Sterling Heights, MI (US); Justin Klotz, Rochester Hills, MI (US); Kaelan S. Goff, Brighton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 18 days.

(21) Appl. No.: 18/970,155

(22) Filed: Dec. 5, 2024

(65) Prior Publication Data

US 2026/0158908 A1     Jun. 11, 2026

(51) Int. Cl.
*B60K 35/215*          (2024.01)
(52) U.S. Cl.
CPC .................................. *B60K 35/215* (2024.01)
(58) Field of Classification Search
None
See application file for complete search history.

(56) References Cited

U.S. PATENT DOCUMENTS

2013/0002414 A1*   1/2013   Konet .................... B60K 35/10
                                              340/436
2017/0270924 A1*   9/2017   Fleurence .............. B60K 35/10
2023/0079801 A1*   3/2023   Lin ........................ B60K 35/85
                                              340/901

FOREIGN PATENT DOCUMENTS

DE      102006036982 A1      2/2008
DE      102008037977 A1      2/2010
DE      102013012703 A1      7/2013
DE      102015225066 A1      6/2017
DE      112016001889 T5      1/2018

* cited by examiner

*Primary Examiner* — Thomas S McCormack
(74) *Attorney, Agent, or Firm* — Quinn IP Law

(57)          ABSTRACT
An instrument panel for a vehicle cabin includes a gauge cluster configured to display data. A vehicle instrument panel also includes a lighting arc, from the perspective of an operator of the vehicle. The lighting arc extends at least partially around the gauge cluster and generates a visual strip via one or more light emitting diode (LED) elements. The lighting arc is configured to represent a vehicle system operating parameter. A motor vehicle having an engine configured to generate torque, a vehicle cabin, and the vehicle instrument panel is also provided.

18 Claims, 3 Drawing Sheets

GAUGE CLUSTER ARC LIGHTING

INTRODUCTION

The present disclosure relates to a gauge cluster with arc lighting for a motor vehicle instrument panel.

An instrument panel (a.k.a. dashboard) is a control panel set within the central console of a vehicle. Typically located directly ahead of the vehicle operator, the instrument panel generally includes gauges visually displaying vehicle information, e.g., vehicle speed and powertrain related data, and controls for vehicle operation. In a motor vehicle, an instrument panel may group analog and/or digital gauges in a gauge cluster set behind and arranged to be seen through the vehicle steering wheel. Some instrument panels incorporate heads-up displays to project select vehicle information onto the vehicle's windscreen in front of the operator.

SUMMARY

An instrument panel for a vehicle cabin includes a gauge cluster configured to display data. A vehicle instrument panel also includes a lighting arc, from the perspective of an operator of the vehicle. The lighting arc extends at least partially around the gauge cluster and generates a visual strip via one or more light emitting diode (LED) elements. The lighting arc is configured to represent a vehicle system operating parameter.

The vehicle instrument panel may additionally include a binnacle configured to house an instrumentation bezel. The gauge cluster may then be arranged within the instrumentation bezel.

The lighting arc may follow a perimeter of the instrumentation bezel, generally surrounding the gauge cluster.

From the perspective of the vehicle operator, the binnacle may be arranged behind a steering wheel of the vehicle or in a center stack near a centerline of the vehicle cabin.

From the perspective of the vehicle operator, the gauge cluster and the lighting arc may be arranged on distinct instrumentation planes. The lighting arc may project from a lower instrumentation plane though the instrumentation plane of the gauge cluster.

Alternatively, the gauge cluster and the lighting arc may be arranged on a common instrumentation plane.

The vehicle may include a powerplant, a sport operating mode, an economy (ECO) operating mode, and a comfort operating mode. The lighting arc may be configured to represent a tachometer configured to display a working speed of the vehicle's engine in the sport operating mode, a charge system indicator in the ECO operating mode, and a heating ventilation and air conditioning (HVAC) state indicator in the comfort operating mode.

The lighting arc may be configured to represent operation of the vehicle's turn signals.

The lighting arc may be configured to represent the vehicle's blind spot warning.

The lighting arc may be configured to generate ambiance lighting.

Each of the LED elements may be configured to provide a red-green-blue (RGB) spectrum of colors.

A motor vehicle having a powerplant configured to generate torque, a vehicle cabin, and the above-described vehicle instrument panel is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
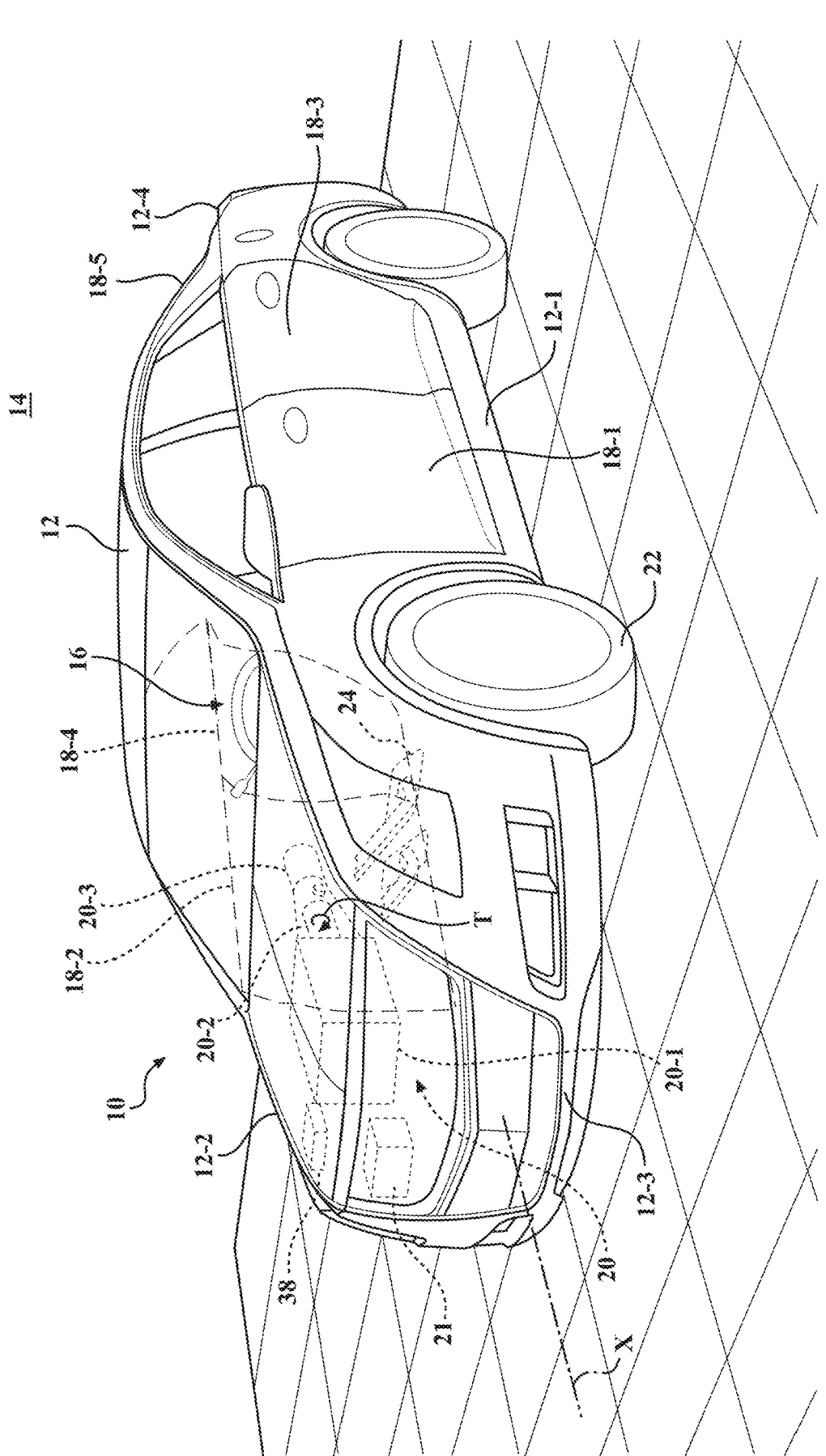
FIG. 1 is a schematic illustration of a representative motor vehicle positioned relative to a road surface, according to the disclosure.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion.

Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims. Moreover, the teachings may be described herein in terms of functional and/or logical block components and/or various processing steps. It should be realized that such block components may include a number of hardware, software, and/or firmware components configured to perform the specified functions.

Referring to the drawings, wherein like reference numbers refer to like components throughout the several views, FIG. 1 schematically depicts a vehicle 10. The vehicle 10 is generally characterized by a vehicle body 12 surrounded by an external environment 14. The vehicle body 12 defines a vehicle interior or passenger cabin 16 configured to accommodate a vehicle operator or driver and passenger(s), for example in a generally seated position. The vehicle body 12 includes a left-side section 12-1, a right-side section 12-2, a front-end section 12-3, and a rear-end section 12-4. The vehicle body 12 may also include a plurality of side doors, such as left-front door 18-1, right-front door 18-2, left-rear door 18-3, and right-rear door 18-4, and a tailgate 18-5 (at the rear-end section 12-4) for gaining access to the vehicle cabin 16.

The vehicle 10 also includes a powertrain 20 configured to generate vehicle propulsion. The powertrain 20 includes a powerplant such as an internal combustion (IC) engine 20-1, electric or traction motor(s) 20-2, and/or a fuel cell (not shown) configured to generate an output torque, and may include a transmission assembly 20-3, e.g., and single or multi-speed automatic transmission, to transmit powerplant torque to at least some of the road wheels 22. The vehicle 10 may therefore be configured as plug-in electric vehicle (PEV), a hybrid electric vehicle (HEV), or be conventionally powered by an IC engine. The vehicle 10 also includes an energy storage device 21, such as an electrochemical battery or a multi-cell rechargeable energy storage system (RESS) configured to supply various systems, as well as the IC engine 20-1, electric motor(s) 20-2, and/or fuel cell with electrical power. The vehicle 10 typically also includes friction brakes (not shown) arranged at the road wheels 22 and engaged by a vehicle brake actuator 24, such as a brake pedal arranged inside the vehicle cabin 16.

Figure 2:
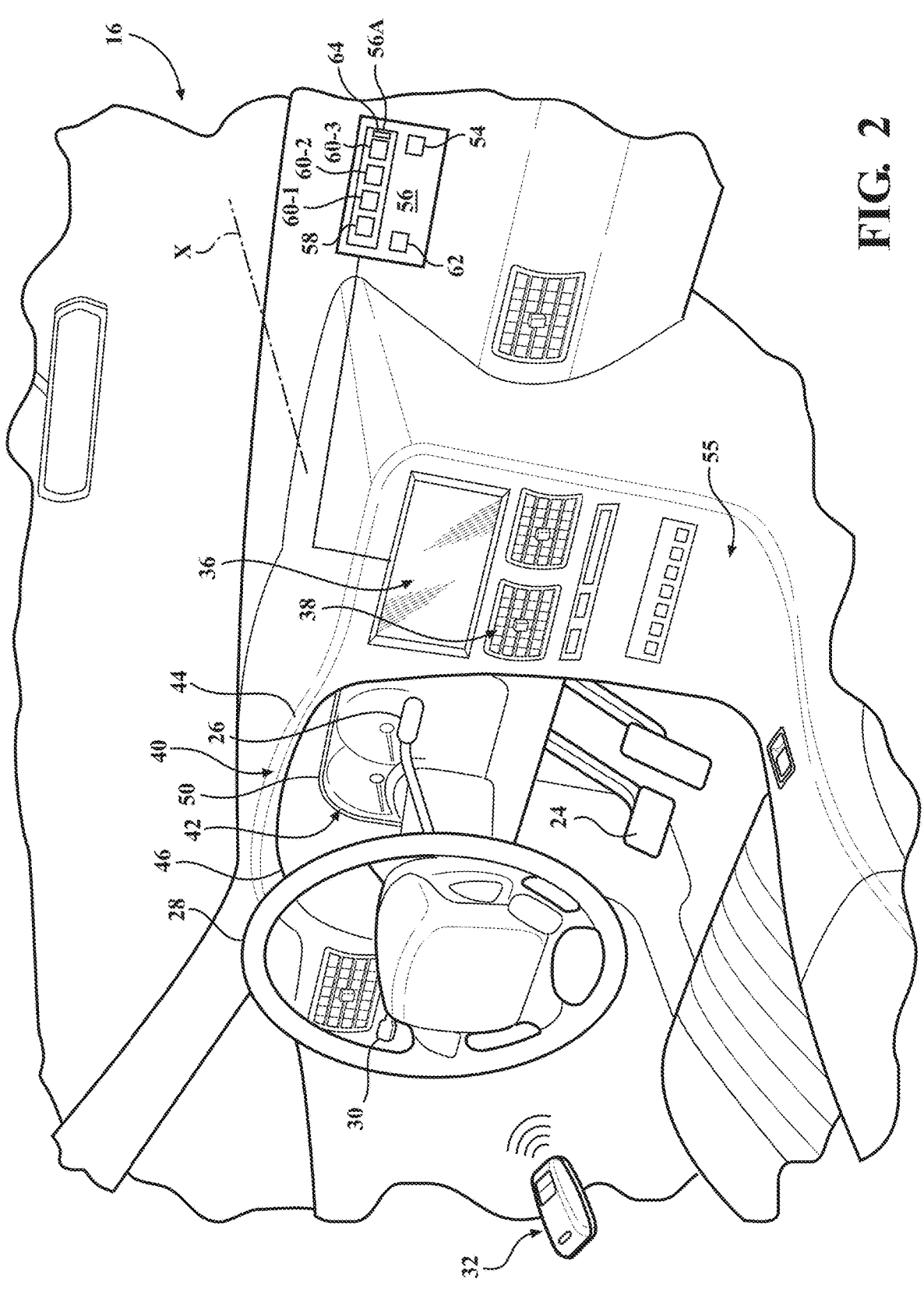
FIG. 2 is a schematic close-up view of the passenger cabin of the vehicle shown in FIG. 1 illustrating a vehicle instrument panel having a gauge cluster and a lighting arc extending at least partially around the gauge cluster to represent a vehicle system operating parameter, according to the disclosure.

As shown in FIG. 2, the vehicle 10 additionally includes a vehicle mode selector 26, such as a shift lever, configured to shift the powertrain 20 between vehicle propulsion modes, e.g., drive, individual forward gear ranges, or reverse, and vehicle park configured to block the vehicle propulsion mode and maintain the vehicle in a stationary state. The vehicle mode selector 26 is arranged inside the vehicle cabin 16 within convenient reach of the vehicle operator, such as near a steering wheel 28. The vehicle 10 may also include a turn signal switch 30 arranged proximate to the steering wheel 28. As shown in FIG. 2, the vehicle 10 further includes a vehicle key 32, such as a physical key, a smart-key (shown), or a fob transmitter. The vehicle key 32 is configured to permit the vehicle operator to activate the powertrain 20, as well as auxiliary vehicle systems, such as infotainment 36 and heating, ventilation, and air conditioning (HVAC) 38.

Figure 3:
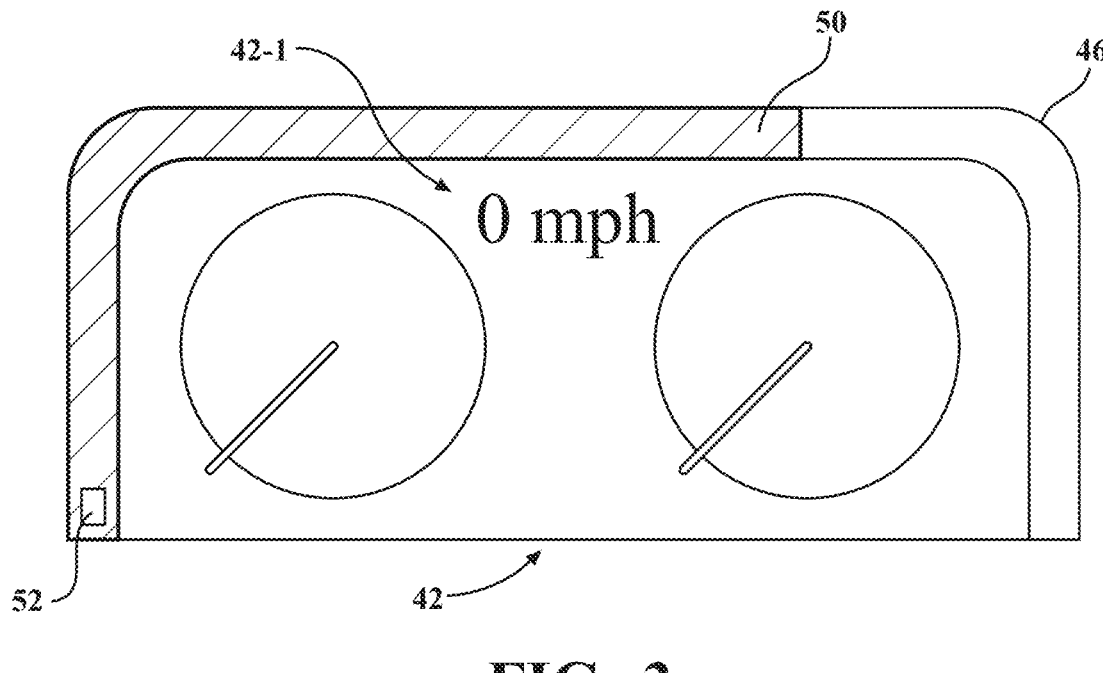
FIG. 3 is a schematic illustration of the gauge cluster arranged within the instrumentation bezel shown in FIG. 2, depicting one embodiment of the lighting arc representing operation of a vehicle system parameter, according to the disclosure.
Figure 4:
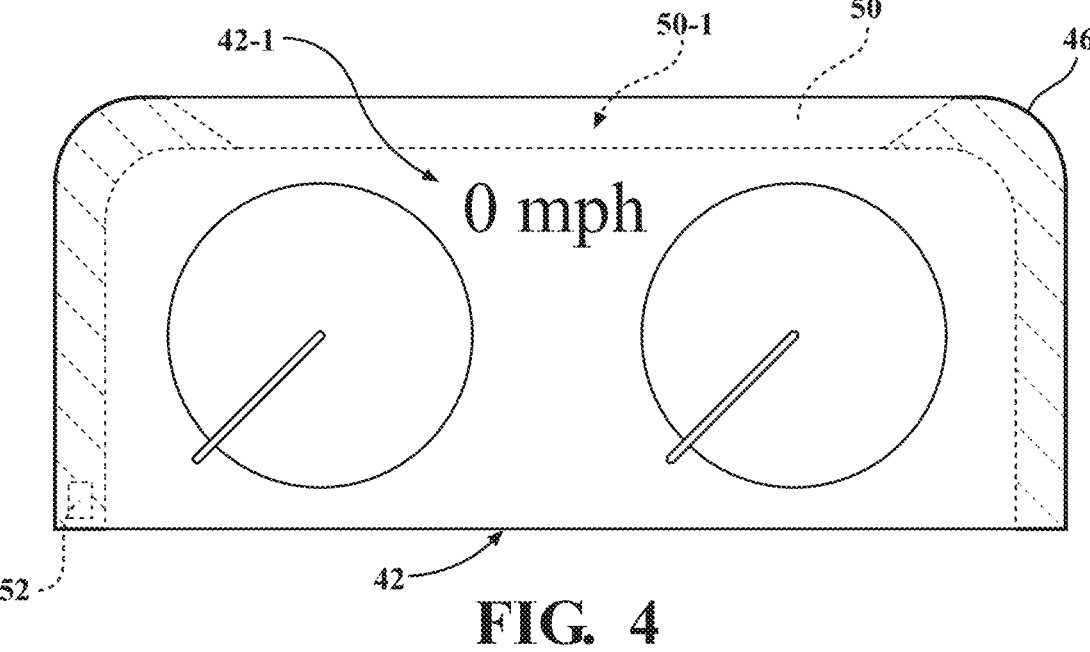
FIG. 4 is a schematic illustration of the gauge cluster arranged within the instrumentation bezel shown in FIG. 2, depicting another embodiment of the lighting arc representing operation of a vehicle system parameter, according to the disclosure.

The vehicle 10 also includes an instrument panel 40 arranged inside the cabin 16. The instrument panel 40 includes a gauge cluster 42 configured to display data to the vehicle operator. The vehicle instrument panel 40 may additionally include a binnacle 44 configured to house an instrumentation bezel 46. As shown in FIGS. 2-4, the gauge cluster 42 may be arranged within the instrumentation bezel 46. With continued reference to FIG. 2, the instrument panel 40 also includes a lighting arc 50. As shown, the lighting arc 50 is arranged to generally curve, arch, and/or sweep around the gauge cluster 42. From the perspective of the vehicle operator, the lighting arc 50 extends at least partially around the gauge cluster 42. The lighting arc 50 generates a visual strip via one or more light emitting diode (LED) elements 52 with varying characteristics, such as color, intensity, and progression. Each of the LED elements 52 may be configured to provide a red-green-blue (RGB) spectrum of colors.

The characteristics of the lighting arc 50 are configured to represent or be indicative of an operating parameter 54 of a selected vehicle system. At least some of the vehicle systems with respective parameters represented by the lighting arc 50 may include the powertrain 20, the energy storage device 21, infotainment 36, and the HVAC 38. As shown in FIGS. 3 and 4, the lighting arc 50 may generally follow the perimeter of instrumentation bezel 46, thus providing a functional surround for the gauge cluster 42 and may also serve as ambiance lighting for cabin 16. The progression of lighting arc 50 relative to or following the perimeter of instrumentation bezel 46 may be configured to represent intensity of operation of the represented system, mode, or parameter. From the perspective of the vehicle operator, the binnacle 44 may be arranged behind the steering wheel 28. Alternatively, the binnacle 44 may be arranged in a center stack 55, to one side of the steering wheel 28 and proximate a display/control panel of the infotainment 36 system. As shown in FIGS. 1 and 2, the center stack 55 is arranged near a centerline X of the vehicle cabin 16.

In the embodiment of the system having the binnacle 44 arranged behind the steering wheel 28, from the perspective of the vehicle operator, the gauge cluster 42 and the lighting arc 50 may be arranged on distinct instrumentation planes, e.g., a higher plane 42-1 and a lower plane 50-1 (shown in FIG. 4). In such an embodiment, the lighting arc 50 may project from the lower instrumentation plane 50-1 (generally hidden from operator's view) through the higher instrumentation plane 42-1 of the gauge cluster 42 and generate a glow effect therethrough. Alternatively, as shown in FIG. 3, the gauge cluster 42 and the lighting arc 50 may be arranged on a common instrumentation surface, such as on the plane 42-1.

The vehicle 10 also includes an electronic controller 56 (shown in FIGS. 1 and 2). The electronic controller 56 may be a central processing unit (CPU) or a body control module (BCM) configured to receive data signals from various vehicle sensors and manage operation of vehicle systems. Specifically, the electronic controller 56 is in operative communication with the powertrain 20, the energy storage device 21, the vehicle brake actuator 24, the vehicle mode selector 26, the vehicle key 32, and the auxiliary systems, such as infotainment 36 and HVAC 38. The electronic controller 56 may be in operative communication with such vehicle systems and sensors via a data network, e.g., a Controller Area Network (CAN bus), arranged in the vehicle 10.

The electronic controller 56 includes a memory 56A that is tangible and non-transitory. The memory 56A may be a recordable medium that participates in providing computer-readable data or process instructions. Such a medium may take many forms, including but not limited to non-volatile media and volatile media. Non-volatile media used by the electronic controller 56 may include, for example, optical or magnetic disks and other persistent memory. Volatile media of each of the controller's memory 56A may include, for example, dynamic random-access memory (DRAM), which may constitute a main memory. Such instructions may be transmitted by one or more transmission medium, including coaxial cables, copper wire and fiber optics, including the wires that comprise a system bus coupled to the vehicle systems.

Memory 56A of the electronic controller 56 may also include a flexible disk, hard disk, magnetic tape, other magnetic medium, a CD-ROM, DVD, other optical medium, etc. The electronic controller 56 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 56 or accessible thereby, generally indicated via numeral 58, may be stored in the memory 56A and automatically executed to provide the required functionality to operate the vehicle 10, including the lighting arc 50.

Specifically, the electronic controller 56 may be programmed with distinct vehicle operating modes, such as a sport operating mode 60-1, an economy (ECO) operating mode 60-2, and a comfort operating mode 60-3. The electronic controller 56 may be further programmed, such as using algorithm(s) 58, to regulate operation of the lighting arc 50 to represent state of operation of various vehicle systems in particular operating modes 60-1, 60-2, 60-3. For example, as shown in FIG. 3 the electronic controller 56 may command the lighting arc 50 to indicate a tachometer configured to display a working speed of the powerplant, such as the vehicle's IC engine 20-1 in the sport mode 60-1, a charge system state or state of charge indicator of the vehicle's energy storage device 21 in the ECO mode 60-2, and an HVAC system 38 state of operation indicator in the comfort mode 60-3.

The electronic controller 56 may also command or be configured to receive a vehicle operator entry (identified generally by numeral 62), such as via the infotainment 36 screen, setting the lighting arc 50 to represent operation of the vehicle's turn signals corresponding to a selected position of the turn signal switch 30 (shown in FIG. 4). The lighting arc 50 may be similarly set to represent operation of the vehicle's hazard to emergency lighting. Analogously, electronic controller 56 may receive a vehicle operator entry 62 for the lighting arc 50 to represent the vehicle's blind spot (area near the vehicle that is outside of the operator's line of sight) warning. The blind spot warning may be indicative of a signal generated by a vehicle sensor, such as a camera or an ultrasonic sensor (not shown), detecting the presence of an object or an obstacle in the vehicle's blind spot. The progression of the lighting arc 50 relative to or following the perimeter of instrumentation bezel 46 may represent strength of the generated signal. The lighting arc 50 may be used for advanced driver-assistance system (ADAS) notifications, such as for autonomous driving.

The lighting arc 50 may also be used to display information passed from the infotainment system via the screen 36, such as volume level generated via vehicle audio speakers when the volume is being changed. Operation or switching of the vehicle system being represented by the lighting arc 50 may be coordinated with an audible sensory indicator 64 generated by the electronic controller 56, such as an audible alert and/or a visual display using the infotainment 36 screen, indicative of the present selection. The electronic controller 56 may be programmed to return to representation by the lighting arc 50 of the same system after vehicle 10 operation has been keyed-off and rekeyed-on or be programmed to restart in a default selection with each subsequent restart.

Overall, the lighting arc 50 may be used as a supplementary gauge or alert feature to represent functional attributes of select vehicle systems. The lighting arc 50 may thereby increase operator's awareness of the subject systems' state of operation. The lighting arc 50 may also be used to enhance the ambiance of vehicle cabin. The lighting arc 50 may be used to represent different system parameters for different vehicle operating modes and be selectively programmed by the vehicle operator. The lighting arc 50 may be included in the vehicle instrumentation arranged directly in front of the driver or in a center stack. The lighting arc 50 may be generated by LED elements covering a full range of colors in the RGB spectrum.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An instrument panel for a cabin of a vehicle, the instrument panel comprising:
    a gauge cluster configured to display data; and
    a lighting arc, from a perspective of an operator of the vehicle, extending at least partially around the gauge cluster, generating a visual strip via at least one light emitting diode (LED) element, and configured to represent a vehicle system operating parameter;
    wherein:
        the vehicle includes a powerplant and a sport operating mode, an economy (ECO) operating mode, and a comfort operating mode; and
        the lighting arc is configured to represent a tachometer configured to display a working speed of the vehicle's engine in the sport operating mode, a charge system indicator in the ECO operating mode, and a heating ventilation and air conditioning (HVAC) state indicator in the comfort operating mode.

2. The instrument panel according to claim 1, further comprising a binnacle configured to house an instrumentation bezel, and wherein the gauge cluster is arranged within the instrumentation bezel.

3. The instrument panel according to claim 2, wherein the lighting arc follows a perimeter of the instrumentation bezel.

4. The instrument panel according to claim 2, wherein, from the perspective of the vehicle operator, the binnacle is arranged behind a steering wheel of the vehicle or in a center stack near a centerline of the vehicle cabin.

5. The instrument panel according to claim 2, wherein, from the perspective of the vehicle operator, the gauge cluster and the lighting arc are arranged on distinct instrumentation planes, and wherein the lighting arc projects from a lower instrumentation plane through the instrumentation plane of the gauge cluster.

6. The instrument panel according to claim 1, wherein the gauge cluster and the lighting arc are arranged on a common instrumentation plane.

7. The instrument panel according to claim 1, wherein the lighting arc is configured to represent operation of the vehicle's turn signals.

8. The instrument panel according to claim 1, wherein the lighting arc is configured to represent a blind spot warning for the vehicle.

9. The instrument panel according to claim 1, wherein the lighting arc is configured to generate ambiance lighting.

10. A motor vehicle comprising:
    a powerplant configured to generate torque;

a sport operating mode, an economy (ECO) operating mode, and a comfort operating mode;
a vehicle cabin; and
a vehicle instrument panel arranged inside the cabin;
wherein the vehicle instrument panel includes:
a gauge cluster configured to display data; and
a lighting arc, from a perspective of an operator of the vehicle, extending at least partially around the gauge cluster, generating a visual strip via at least one light emitting diode (LED) element, and configured to represent a vehicle system operating parameter;
wherein the lighting arc is configured to represent a tachometer configured to display a working speed of the vehicle's engine in the sport operating mode, a charge system indicator in the ECO operating mode, and a heating ventilation and air conditioning (HVAC) state indicator in the comfort operating mode.

11. The motor vehicle according to claim 10, wherein:
the vehicle instrument panel additionally includes a binnacle configured to house an instrumentation bezel;
the gauge cluster is arranged within the instrumentation bezel; and
the lighting arc follows a perimeter of the instrumentation bezel.

12. The motor vehicle according to claim 11, wherein, from the perspective of the vehicle operator, the binnacle is arranged behind a steering wheel of the vehicle or in a center stack near a centerline of the vehicle cabin.

13. The motor vehicle according to claim 11, wherein, from the perspective of the vehicle operator, the gauge cluster and the lighting arc are arranged on distinct instrumentation planes, and wherein the lighting arc projects from a lower instrumentation plane through the instrumentation plane of the gauge.

14. The motor vehicle according to claim 10, wherein the gauge cluster and the lighting arc are arranged on a common instrumentation plane.

15. The motor vehicle according to claim 10, wherein the lighting arc is configured to represent operation of the vehicle's turn signals.

16. The motor vehicle according to claim 10, wherein the lighting arc is configured to represent a blind spot warning for the vehicle.

17. The motor vehicle according to claim 10, wherein the lighting arc is configured to generate ambiance lighting.

18. A motor vehicle comprising:
a powerplant configured to generate torque;
a vehicle cabin; and
a vehicle instrument panel arranged inside the cabin;
wherein the vehicle instrument panel includes:
a gauge cluster configured to display data; and
a lighting arc, from a perspective of an operator of the vehicle, extending at least partially around the gauge cluster, generating a visual strip via at least one light emitting diode (LED) element, and configured to represent a vehicle system operating parameter;
wherein:
the vehicle instrument panel additionally includes a binnacle configured to house an instrumentation bezel;
the gauge cluster is arranged within the instrumentation bezel; and
the lighting arc follows a perimeter of the instrumentation bezel; and
wherein:
from the perspective of the vehicle operator, the gauge cluster and the lighting arc are arranged on distinct instrumentation planes; and
the lighting arc projects from a lower instrumentation plane through the instrumentation plane of the gauge cluster.

* * * * *